2,845,344

PROCESS FOR PURIFYING MERCURY

Walter J. Sakowski, Youngstown, N. Y., assignor to Olin Mathieson Chemical Corporation, a corporation of Virginia No Drawing. Application October 26, 1954
Serial No. 464,910

7 Claims. (Cl. 75—81)

This invention relates to the purification and recovery of mercury, particularly from so-called "thick" mercury produced in minor proportions in the operation of mercury cathode electrolytic cells.

In the operation of mercury cathode electrolytic cells, even with extensive purification of the electrolyte, good construction and effective control, the formation of so-called "thick" mercury in minor proportions apparently cannot be entirely avoided. This material, having the consistency of butter, can accumulate in the end boxes or in any stagnant or semi-stagnant part of the system and thus interferes with the flow of mercury. While thick mercury can be removed as such by mechanical means, such as skimming, because of the value of the contained mercury, its mercury content must be recovered.

Two types of thick mercury are to be distinguished. When the operation of the cell or of the decomposer is not maintained within suitable limits, the amalgam can contain excessive proportions of alkali metal. For example, the decomposer may not thoroughly remove the alkali metal from the amalgam. Thick mercury of this type, due to excessive concentration of alkali metals, is usually recoverable by treatment with dilute inorganic acids. This thick mercury, readily identified by its low density, can be thoroughly agitated with dilute hydrochloric acid, substantially removing alkali metal from the amlagam and converting it to alkali metal chloride.

Another type of thick mercury, which is not amenable to treatment with dilute aqueous acids, is sometimes formed due to the solution of metals derived from the brine, or from the cell or other sources. Apparently such refractory thick mercury, readily identified by its high density, contains metals such as iron, copper, calcium or the like. Treatment of thick mercury of the second kind with dilute aqueous acid produces substantially no change and the mercury is not suitable for reuse. Various oxidizing agents have been used in the recovery of the mercury contained in such compositions but such processes are expensive and difficult. Nevertheless, recovery is essential because of the value of the mercury.

An important object of the present invention is to provide means for the treatment of thick mercury for the recovery of mercury therefrom where the thick mercury is of the refractory type which is unaffected by dilute aqueous acids.

The process of the present invention contemplates treatment of the refractory thick mercury with an acid aqueous solution of an ammonium salt. The thick mercury is agitated with the aqueous solution, advantageously employing a graphite paddle or other agitator. Thereafter, the mercury is allowed to separate and is returned to the mercury circulation system of the cell. It can be washed with water to remove residual acid and ammonium salts if desired. The process is also effective on the less refractory type of thick mercury and can be used generally in the purification of mercury to remove alloying metals.

Suitable salts include ammonium salts of mineral acids, such as ammonium chloride, ammonium sulfate and the like. The corresponding mineral acids, such as hydrochloric acid and sulfuric acid, are preferably used. The concentration of the salt is not critical and can be for example, from 1 to 15 percent by weight, or more. About the same proportion of acid is used.

Incorporation of the ammonium salt with the dilute mineral acid has a remarkable effect on the thick mercury, otherwise unaffected by the dilute acid. Even with a short period of agitation, the viscosity of the thick mercury is reduced substantially to that of pure mercury. The impurities are quickly removed and dissolved or suspended in the aqueous portion. The thus purified mercury is suitable for reuse in the electrolytic cell.

Although the present invention is not limited to any theoretical discussion of the mechanism of the reaction, it appears that the purification of thick mercury may be a form of corrosion in which the acid removes the more reactive alloying element in the amalgam. With ordinary thick mercury, containing excessive proportions of alkali metal, for example, sodium, corrosion or purification may occur due to the action of the dissolved sodium, as an anode, and the mercury, as a cathode. The reactions in the presence of acid may be as follows:

Anodic reaction: $Na \rightarrow Na^+ + \epsilon$
Cathodic reaction: $H^+ + \epsilon \rightarrow \tfrac{1}{2} H_2$ Although hydrogen has a high over-voltage on mercury and is difficultly discharged as gas, apparently the driving force of the reaction of sodium metal to form sodium ion is sufficient to overcome the over-voltage and dilute acid is effective in removing the sodium, discharging hydrogen at the cathodic mercury surface.

It might be expected that heavier metals would behave similarly but the driving force for the conversion of these metals to ions is much lower and apparently is insufficient to force the cathodic discharge of hydrogen on the mercury surface. The analogous reaction with iron, for example, might be expected according to the following equations:

Anodic reaction: $\tfrac{1}{3} Fe \rightarrow \tfrac{1}{3} Fe^{+++} + \epsilon$
Cathodic reaction: $H^+ + \epsilon \rightarrow \tfrac{1}{2} H_2$ However, the high over-voltage of hydrogen on mercury apparently prevents this reaction and the mercury is not purified by treatment with dilute acid. The cathodic reaction is therefore controlling the corrosion or purification of the amalgam. It is apparent that a different cathodic reaction is required.

When an ammonium salt is incorporated with the acid in aqueous solution, however, the ion discharging at the mercury surface in the cathodic reaction is the ammonium ion rather than the hydrogen ion. Since the discharge potential of the ammonium ion on mercury is low, this reaction proceeds easily and the driving force for the conversion of iron to iron ion is apparently sufficient to cause both reactions to occur according to the following equations:

Anodic reaction: $\tfrac{1}{3} Fe \rightarrow \tfrac{1}{3} Fe^{+++} + \epsilon$
Cathodic reaction: $NH_4^+ + \epsilon \rightarrow NH_4^0$ At some point slightly removed from the mercury surface, the neutral ammonium group decomposes and hydrogen is formed, regenerating ammonium ions as shown in the following equations:

$$NH_4^0 \rightarrow NH_3 + \tfrac{1}{2} H_2$$
$$NH_3 + H^+ \rightarrow NH_4^+$$

With efficient agitation, the recovery of the mercury is very rapid. Solutions of the acidified ammonium salt and thick mercury darken instantly with the formation of metal compounds soluble or suspended in water.

*Example I*

About 50 pounds of thick mercury containing iron, copper, calcium and other metals which had resisted all previous attempts at purification were cleaned up and returned to the plant mercury circulating system. The thick mercury was charged to an agitator fitted with graphite paddles together with about one-eighth its volume of a solution of acidified ammonium chloride as the oxidizing medium. The solution contained about 100 ml. of muriatic acid (32% HCl) and 300 grams of ammonium chloride in 2 liters of water. The thick mercury became liquid after a period of less than an hour. The treatment was continued for a total of about eight hours to insure complete purification. The mercury was returned to service and exhibited no problem in the operation of mercury cells.

*Example II*

Example I is repeated substituting a treating solution which contains 50 ml. of concentrated sulfuric acid (98%) and 300 grams of ammonium sulfate in 2 liters of water. The liquid mercury which is recovered is suitable for return to service in mercury cathode electrolytic cells.

The use of acid aqueous solutions containing ammonium salts in accordance with this invention effectively insures complete purification of any contaminated mercury. Such solutions can, thus, be suitably used as oxidizing media in conventional oxyfiers to produce mercury of purity equal to that of distilled mercury and will achieve such a result more readily than the mineral acid mediums now used.

I claim:

1. A process for purifying mercury containing alloying metal impurities, which metal impurities are not effectively removed by treatment with dilute aqueous mineral acids alone, which comprises agitating the mercury in contact with an aqueous acid solution of a mineral acid and an ammonium salt of a mineral acid, in which solution the mineral acid and the ammonium salt are each present in an amount of at least about 1% by weight, whereby metal impurities contained in the mercury are removed in the aqueous solution.

2. A process for recovering purified mercury from thick mercury, which thick mercury contains alloying metal impurities which are not effectively removed by treatment with dilute aqueous mineral acids alone, which comprises agitating the thick mercury in contact with an aqueous acid solution of a mineral acid and an ammonium salt of a mineral acid, in which solution the mineral acid and the ammonium salt are each present in an amount of at least about 1% by weight, whereby metal impurities contained in the thick mercury are removed in the aqueous solution.

3. A process according to claim 2 in which the aqueous solution contains hydrochloric acid and ammonium chloride.

4. A process according to claim 2 in which the aqueous solution contains sulfuric acid and ammonium sulfate.

5. A process for recovering purified mercury from thick mercury containing as an alloying impurity a metal selected from the group consisting of iron, copper and calcium, which comprises agitating the thick mercury in contact with an aqueous acid solution of a mineral acid and an ammonium salt of a mineral acid, in which solution the mineral acid and the ammonium salt are each present in an amount of at least about 1% by weight, whereby metal impurities contained in the thick mercury are removed in the aqueous solution.

6. A process according to claim 5 in which the aqueous solution contains hydrochloric acid and ammonium chloride.

7. A process according to claim 5 in which the aqueous solution contains sulfuric acid and ammonium sulfate.

References Cited in the file of this patent

UNITED STATES PATENTS

| 447,344 | Myers | Mar. 3, 1891 |
| 1,402,742 | Codding | Jan. 10, 1922 |
| 2,440,456 | Alley et al. | Apr. 27, 1948 |

FOREIGN PATENTS

| 396,041 | Great Britain | July 18, 1933 |
| 860,280 | Germany | Dec. 18, 1952 |

OTHER REFERENCES

Hackh's Chemical Dictionary, 3rd ed., by grant, page 38 ("alum"). Published 1953 by The Blakiston Co., Inc., N. Y.

Remy: Treatise on Inorganic Chemistry, page 783, published 1956 by Elsevier Publ. Co., N. Y.